(12) United States Patent
Meyer et al.

(10) Patent No.: US 10,308,138 B2
(45) Date of Patent: *Jun. 4, 2019

(54) HYBRID ELECTRIC VEHICLE CREEP CONTROL

(71) Applicant: Ford Global Technologies, LLC, Dearborn, MI (US)

(72) Inventors: Jason Meyer, Canton, MI (US); Rajit Johri, Canton, MI (US); Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/151,548

(22) Filed: May 11, 2016

(65) Prior Publication Data

US 2017/0327005 A1 Nov. 16, 2017

(51) Int. Cl.
*B60L 15/20* (2006.01)
*B60K 6/38* (2007.10)
(Continued)

(52) U.S. Cl.
CPC ............ *B60L 15/2063* (2013.01); *B60K 6/38* (2013.01); *B60K 6/40* (2013.01); *B60K 6/46* (2013.01);
(Continued)

(58) Field of Classification Search
CPC ... B60K 6/48; B60K 6/38; B60K 6/40; B60K 6/46; B60K 6/54; B60K 2006/4825; B60W 30/18063; B60W 20/50; B60W 10/02; B60W 10/06; B60W 10/08; B60W 10/10; B60W 20/40; B60W 20/00; B60W 2510/1005; B60W 2540/10; B60W 2540/16; B60W 2710/081; B60W 2720/10; B60W 20/15; B60W 2540/12; B60W 2520/10; B60W 2510/081; B60W 10/026; B60W 2710/083; B60W 2050/0012; B60Y 2400/426; B60Y 2300/18058; B60Y 2200/92; B60Y 2300/188; B60L 15/2063; B60L 2260/42; B60L 2240/423; B60L 50/16; B60L 2240/421; B60L 2240/26;
(Continued)

(56) References Cited

U.S. PATENT DOCUMENTS

6,895,322 B2 5/2005 Walenty et al.
7,562,732 B2 7/2009 Zillmer et al.
(Continued)

*Primary Examiner* — Nga X Nguyen
(74) *Attorney, Agent, or Firm* — David Kelley; Brooks Kushman P.C.

(57) ABSTRACT

A vehicle includes an engine, and a transmission including a torque converter having an impeller. The vehicle further includes an electric machine configured to provide drive torque to the impeller. The impeller is selectively coupled to the engine via a clutch. At least one vehicle controller is configured to, in response to the engine being OFF, the transmission being in DRIVE, a vehicle speed being zero and a brake pedal being released beyond a threshold position, command the electric machine to provide a torque to the impeller. The torque is a predetermined feedforward torque adjusted by a feedback torque that is based on a difference between measured and calculated speeds. The speeds may be the speeds of the electric machine.

19 Claims, 4 Drawing Sheets

(51) Int. Cl.
| | |
|---|---|
| *B60K 6/40* | (2007.10) |
| *B60K 6/46* | (2007.10) |
| *B60K 6/54* | (2007.10) |
| *B60W 20/15* | (2016.01) |
| *B60K 6/48* | (2007.10) |
| *B60W 10/02* | (2006.01) |
| *B60W 10/08* | (2006.01) |
| *B60W 30/18* | (2012.01) |
| *B60L 50/16* | (2019.01) |
| *B60W 50/00* | (2006.01) |

(52) U.S. Cl.
CPC ............... *B60K 6/48* (2013.01); *B60K 6/54* (2013.01); *B60L 50/16* (2019.02); *B60W 10/026* (2013.01); *B60W 10/08* (2013.01); *B60W 20/15* (2016.01); *B60W 30/18063* (2013.01); *B60K 2006/4825* (2013.01); *B60L 2240/26* (2013.01); *B60L 2240/421* (2013.01); *B60L 2240/423* (2013.01); *B60L 2240/642* (2013.01); *B60L 2260/42* (2013.01); *B60W 2050/0012* (2013.01); *B60W 2510/081* (2013.01); *B60W 2520/10* (2013.01); *B60W 2540/12* (2013.01); *B60W 2710/083* (2013.01); *B60Y 2200/92* (2013.01); *B60Y 2300/188* (2013.01); *B60Y 2300/18058* (2013.01); *B60Y 2400/426* (2013.01); *Y02T 10/6221* (2013.01); *Y02T 10/6252* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y02T 10/7291* (2013.01); *Y02T 90/16* (2013.01); *Y10S 903/912* (2013.01); *Y10S 903/917* (2013.01); *Y10S 903/93* (2013.01); *Y10S 903/951* (2013.01)

(58) Field of Classification Search
CPC ............ B60L 2240/642; Y10S 903/912; Y10S 903/917; Y10S 903/951; Y10S 903/93; Y02T 10/72; Y02T 10/7077; Y02T 10/6221; Y02T 10/6252; Y02T 90/16; Y02T 10/645; Y02T 10/7275; Y02T 10/7291; Y02T 10/70
USPC ........... 477/45, 12, 17, 18, 158, 159, 161, 5; 180/65.265; 903/902
See application file for complete search history.

(56) References Cited

U.S. PATENT DOCUMENTS

| | | | |
|---|---|---|---|
| 8,140,238 | B2 | 3/2012 | Luehrsen et al. |
| 8,200,404 | B2 | 6/2012 | Zhang et al. |
| 8,315,752 | B2 | 11/2012 | Kwon et al. |
| 9,056,604 | B2 | 6/2015 | Lochocki, Jr. et al. |
| 2014/0129068 | A1* | 5/2014 | Higa ................ B60K 6/445 701/22 |
| 2015/0111693 | A1* | 4/2015 | Wang ................ B60K 6/48 477/5 |

* cited by examiner

HYBRID ELECTRIC VEHICLE CREEP CONTROL

TECHNICAL FIELD

The present disclosure relates to creep control in hybrid-electric vehicles (HEVs).

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes an engine and a transmission. The transmission includes a torque converter having an impeller. The vehicle further includes an electric machine configured to provide drive torque to the impeller. The impeller is selectively coupled to the engine via a clutch. At least one vehicle controller is configured to, in response to the engine being OFF, the transmission being in DRIVE, a vehicle speed being zero and a brake pedal being released beyond a threshold position, command the electric machine to provide a torque to the impeller. The torque is a predetermined feedforward torque adjusted by a feedback torque that is based on a difference between actual and target speeds. The speeds may be the speeds of the electric machine.

According to another embodiment, a vehicle includes a powertrain having an electric machine driveably connected to an impeller of a torque converter. The vehicle also includes a controller configured to, in response to vehicle speed being zero and a brake pedal being released beyond a threshold position, command the electric machine to provide a torque to the impeller, the torque being a predetermined feedforward torque adjusted by a feedback torque that is based on a difference between measured and target speeds.

According to yet another embodiment, a method of restarting a torque-converter impeller driveably connected to an electric machine is presented. The method includes, in response to a vehicle speed being zero and a brake pedal being released beyond a threshold position, commanding the electric machine to provide a torque to the impeller, the torque being a predetermined feedforward torque proportionally adjusted according to a difference between measured and target electric machine speeds.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
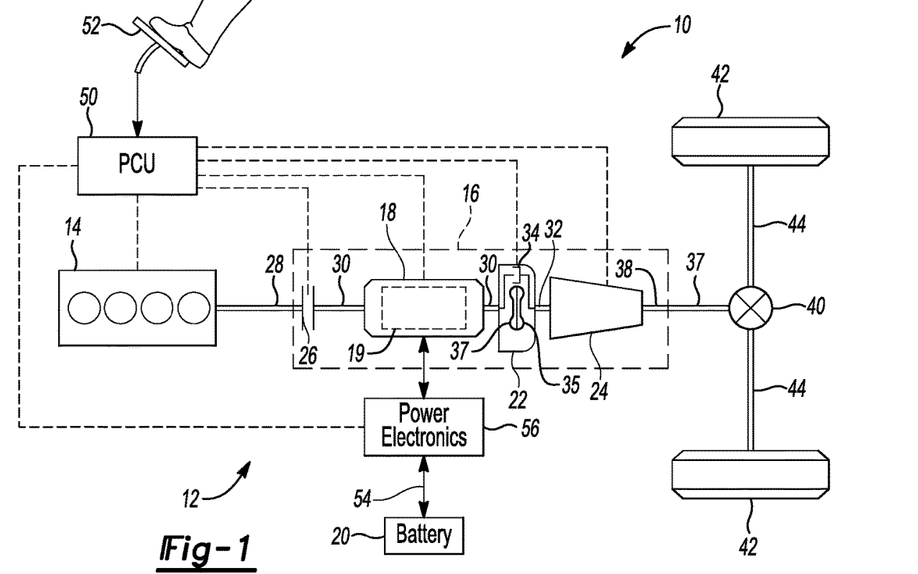
FIG. 1 is a schematic diagram of an example HEV.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having an engine 14 that drives a transmission 16, which may be referred to as a modular-hybrid transmission (MHT). As will be described in further detail below, a transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent-magnet-synchronous motor. Power electronics 56 condition direct current (DC) provided by the battery 20 to the requirements of the M/G 18, as will be described below. For example, power electronics may provide three-phase alternating current (AC) to the M/G 18.

When the disconnect clutch 26 is at least partially engaged, power flows from the engine 14 to the M/G 18. Power flow from the M/G 18 to the engine 14 is also possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. The shaft 30 extends through the M/G 18. The rotor 19 of the M/G 18 is fixed on the shaft 30, whereas the engine 14 is selectively driveably connected to the shaft 30 only when the disconnect clutch 26 is at least partially engaged.

The M/G 18 is driveably connected to the torque converter 22 via the shaft 30. For example, the torque-converter housing may be fastened to the shaft 30. The torque converter 22 is therefore driveably connected to the engine 14 when the disconnect clutch 26 is at least partially engaged. Two components are driveably connected if they are connected by a power flow path that constrains their rotational speeds to be directly proportional. The torque converter 22 includes an impeller 35 fixed to the torque-converter housing (and consequently, fixed to the rotor 19) and a turbine 37 fixed to a transmission input shaft 32. The torque converter 22 provides a hydraulic coupling between the shaft 30 and the transmission input shaft 32. The torque converter 22 transmits power from the impeller 35 to the turbine 37 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU) 50. The gearbox 24 then provides powertrain output torque to output shaft 38. The output shaft 38 may be connected to a driveline 37 (e.g., a driveshaft and universal joints) that connects the output shaft 38 to the differential 40.

It should be understood that the hydraulically controlled gearbox 24 used with a torque converter 22 is but one example of a gearbox or transmission arrangement; any multiple-ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 37 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure (if applicable), crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust-gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal position sensor. In general, depressing and releasing the pedal 52 causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the bypass clutch 34 can be modulated across a range between the engaged and disengaged positions. This produces a variable slip in the torque converter 22 in addition to the variable slip produced by the hydrodynamic coupling between the impeller and the turbine. Alternatively, the bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Most conventional vehicles with an automatic transmission have creep control that allows a driver to move the vehicle at low speeds by simply releasing the brake without pressing the accelerator pedal. Creep control utilizes the torque produced at engine-idle speed to propel the vehicle. Most automatic transmissions have a torque converter. The torque-converter impeller (connected to the crankshaft) transfers torque to the turbine (connected to the transmission input shaft) hydrodynamically. This hydrodynamic coupling only occurs when the impeller speed is above a turbine-stall speed. The torque converter is configured such that idle speed is above the stall speed. Thus, in a conventional vehicle, the impeller and turbine are hydrodynamically coupled when the engine is ON. The vehicle will be propelled, without lag, once the engine torque exceeds the braking torque, which typically occurs prior to full release of the brake pedal.

Drivers have grown accustom to creep control, as such, it may be advantageous to program electric and hybrid vehicles to mimic the creep control of conventional vehicles. Rather than using the engine, hybrid vehicles may provide creep torque with the electric machine. In hybrid vehicles with a torque converter (such as vehicle 10), the electric machine may be programmed to spin at a speed that approximates engine idle (e.g., 800 RPM) to maintain hydrodynamic coupling within the torque converter during times when creep control is expected. Unlike conventional vehicles, in which the impeller is spinning at idle speed when the vehicle is stopped with the engine running, hybrid vehicles typically turn OFF the electric machine when stopped to preserve the battery state of charge (SOC). Thus, hydrodynamic coupling is not maintained when the hybrid vehicle is stopped. Once creep torque is requested, the impeller must spin-up to the turbine-stall speed before any creep torque is provided to the driven wheels. Drivers have come to expect the immediate propulsion that conventional vehicles provide when the brakes are at least partially released. To limit the delay and provide a satisfactory driving experience, hybrid vehicles should spin-up the impeller to turbine-stall speed as quickly as possible to reduce the delay. When the turbine is stalled, reaction forces of the torque converter are low and a majority of the electric-machine torque is used to accelerate the impeller. Creating a control strategy that accurately and quickly accelerates the impeller to idle speed is difficult to execute.

Figure 2:
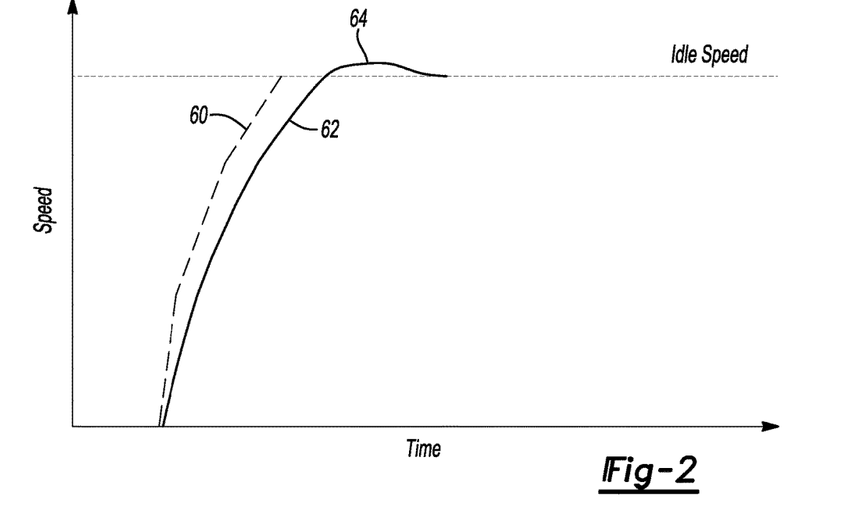
FIG. 2 is a plot illustrating speed for an example impeller/motor that is controlled using feedback control.

FIG. 2 illustrates plots of impeller/motor speed associated with a feedback control for spinning-up the impeller. The feedback control may use proportional-integral-derivative (PID) control to adjust the torque applied by the electric machine. In this strategy, the controller calculates a target speed curve 60. Using feedback control, the electric machine increase or decreases the torque to reduce the error between the target speed 60 and the measured speed 62. The speeds may be that of the impeller or the electric machine. One problem with pure feedback control is that the speed may overshoot the target idle speed as shown at 64. This creates jerky torque that is perceivable by the driver and is considered to be an unsatisfactory driving experience. Another problem is that the measured speed 62 lags behind the target speed 60. In the illustrated example, the target-speed plot 60 reached idle speed 50 milliseconds faster than the actual-speed plot 62. This time period is noticeable by the driver and may be perceived as unsatisfactory delay. One way to avoid overshoot using feedback control is to limit the slope of the target speed 60 near the idle speed. While this may reduce overshooting, it further increases the time it takes the impeller to reach idle speed, which may be undesirable.

In order to solve these and other problems, impeller spin-up may be controlled by a control strategy having a torque algorithm with feedforward and feedback components. Equation 1 is an example electric-machine-torque equation that includes both feedforward and feedback components.

$$\tau = J\frac{d\omega commanded}{dt} \pm P\cdot e + I\int edt + D\cdot\dot{e} \quad \text{(Eq. 1)}$$

where: J is inertia of the impeller; ω is angular speed; e is the error between $\omega_{commanded}$ and $\omega_{measured}$; and P, I, and D are constants of the PID control.

Equation 1 may be used to control torque to the M/G 18 during impeller spin-up. Impeller spin-up is typically initiated in response to the vehicle being stop, the impeller being below turbine-stall speed (idle speed), and creep control being requested by the driver. For example, impeller spin-up may be initiated when the brake torque requested by the driver approaches the wheel torque produced by the impeller when spinning at idle speed. The feedforward component includes one or more predetermined torques that are applied for a predetermined time. The predetermined time may be the expected time that it takes for the impeller to spin-up to the desired idle speed. The predetermined torques may be stored in one or more lookup tables stored in memory of the controller 50. Different feedforward torques may be applied in different situations. For example, one feedforward torque may be used when the impeller is spun-up to support a transmission engagement from NEUTRAL to DRIVE, and another may be used when the brake pedal is released with the transmission in DRIVE.

The feedback component adjusts the feedforward component based on an error (e) between the commanded speed and the measured speed of the impeller 35 or the M/G 18. The feedback loop may use PID controls or may use PD or PI controls. The feedback torque may be limited to plus or minus 40 newton meters (N·m) since a majority of the torque is being provided by the feedforward component. If the error requires a torque correction in excess of 40 N·m, a mechanical failure may have occurred and limiting the feedback may reduce potential damage since the feedforward torque is only supplied for a short duration of time. (In contrast, feedback control does not have this capability without using other checks.) The speeds may be the impeller speed or the M/G speed. In the vehicle 10, the rotor 19 and the impeller 35 are fixed relative to each other. Since electric machines typically include a speed sensor, unlike torque converts which do not, the below example controls will use M/G speeds in Eq. 1 as it does not require additional speed sensors.

Figure 3A:
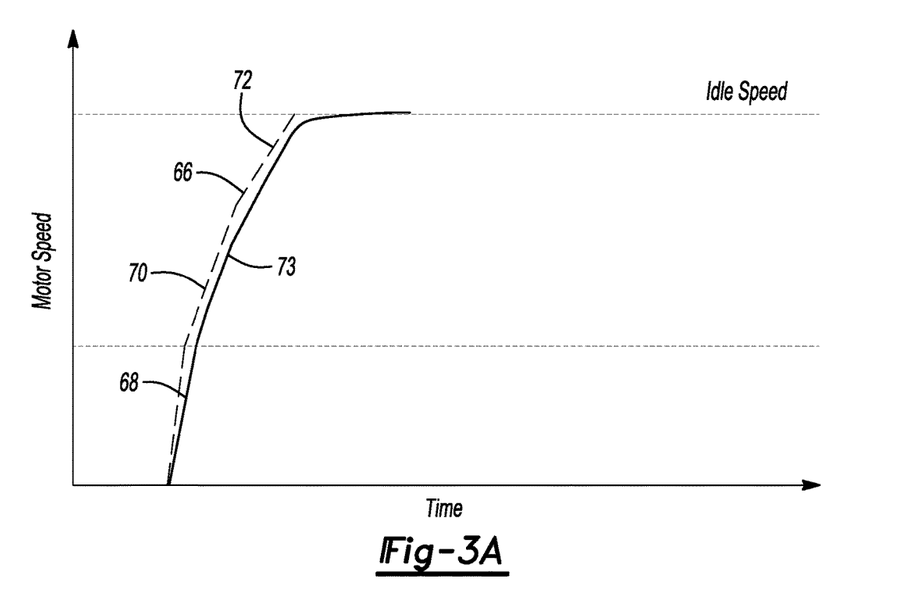
FIG. 3A is a plot illustrating speeds associated with an example electric machine that is controlled using feedforward and feedback controls.
Figure 3B:
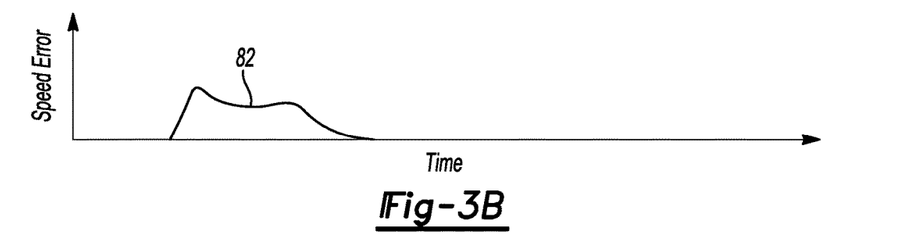
FIG. 3B is a plot illustrating the speed error of the electric machine from the example in FIG. 3A.
Figure 3C:
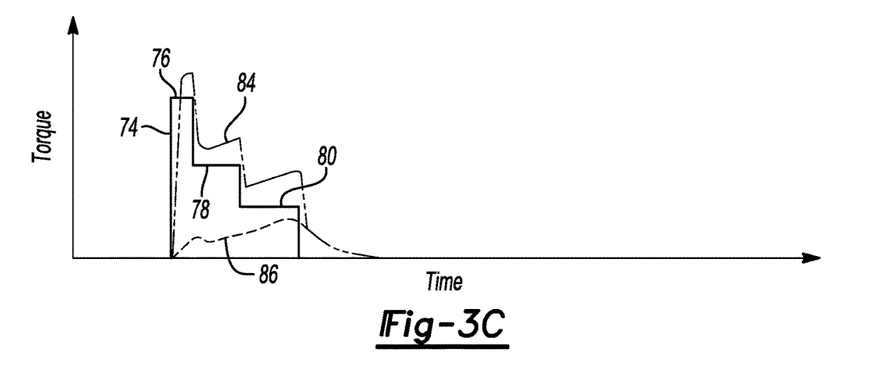
FIG. 3C is a plot illustrating torques associated with the electric machine from the example in FIG. 3A.
Figure 4:
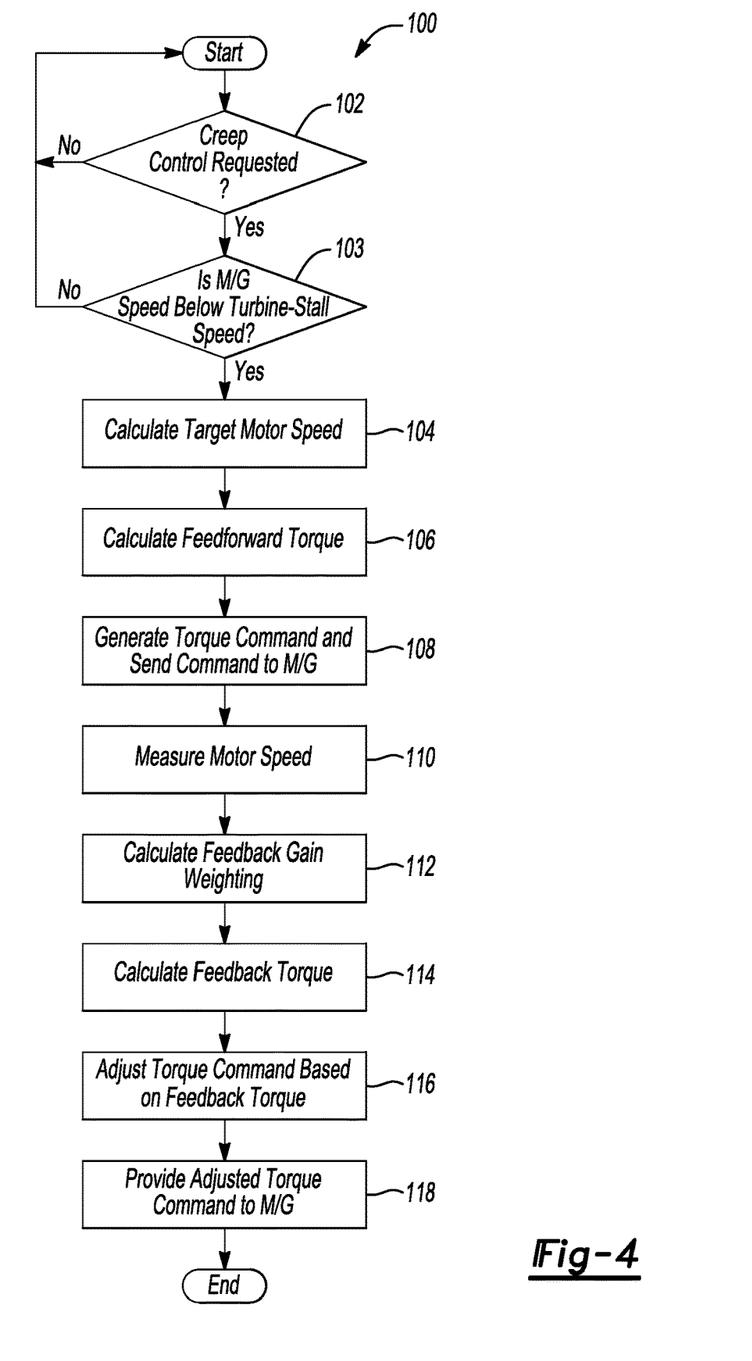
FIG. 4 is a flow chart illustrating an algorithm for controlling motor/generator speed in an HEV according to one embodiment of the present disclosure.

FIGS. 3A to 3C illustrates a series of plots associated with a combined feedforward and feedback control strategy. The plots will be described in conjunction with the flowchart 100 shown in FIG. 4. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than that illustrated in the Figures. Similarly, one or more steps or functions may be repeatedly performed, although not explicitly illustrated. In one embodiment, the functions illustrated are primarily implemented by software, instructions, code or control logic stored in a computer-readable storage medium and executed by one or more microprocessor-based computers or controllers to control operation of the vehicle. All of the illustrated steps or functions are not necessarily required to provide various features and advantages according to the present disclosure. As such, some steps or functions may be omitted in some applications or implementations. The algorithm for controlling a motor in an HEV according to one embodiment of the present disclosure as illustrated in FIG. 4 includes steps or functions that may be represented by control logic or software executed by one or more microprocessor-based controllers, such as controller 50, for example.

At operation 102 the controller 50 determines if creep control is being requested by the driver. It can be determined that creep control is being requested in response to one or more of the following: the engine being OFF, the transmission being in DRIVE, the electric machine speed being zero, the vehicle speed being zero, a brake pedal being released beyond a threshold position (this threshold can vary depending on the grade of the road and vehicle weight), and the accelerator pedal is not depressed. If creep control is being requested, control passes to operation 103 and the controller determines if the M/G speed is below the turbine-stall speed. If no, control loops back to the start. If yes, the controller enters into impeller-spin-up control and control passes to operation 104. At 104, a target M/G speed plot 66 is calculated. The speed plot 66 may include one or more rates such as a first rate 68, a second rate 70, and a third rate 72. Having more than one rate provides greater control of the acceleration of the impeller during spin-up. The first target rate 68 may be used between a M/G speed of zero up to a M/G speed that corresponds to a speed required to create line pressure within the transmission (e.g., 300 RPM). The first rate 68 may be the steepest rate in order to quickly generate line pressure within the transmission. The first rate 68 may also be the steepest because it is farthest away from the idle speed and poses less threat to overshooting the idle speed, which is to be avoided. The second rate 70 may be the second steepest rate and is used between the line pressure speed and another M/G speed that may vary depending upon operating conditions. The third rate 72 may have the shallowest scope to prevent overshooting the idle speed. Of course, the three-rate example is not limiting, and more or fewer rates may be used.

At operation 106 the controller calculates a feedforward torque 74 for each of the speed rates. Each of the feedforward torques are commanded for a predetermined time that corresponds with the expected time it takes the M/G (and impeller) to reach the target speed. In the illustrated embodiment, three feedforward torques are calculated because three rates are being used. A first feedforward torque 76 is commanded during the first rate 68, a second feedforward torque 78 is commanded during the second rate 70, and a third feedforward torque 80 is commended during the third rate 72. Accelerating the impeller from rest requires more torque than further accelerating the impeller. Thus, the first feedforward torque 76 is the highest torque and the last feedforward torque 80 is the lowest torque. At operation 108 a torque command is generated and sent to the M/G 18.

At operation 110 the M/G speed may be determined by a speed sensor the measures a component associated with the M/G. In one embodiment, the M/G 18 includes a speed sensor that measures the angular speed of the rotor 19. The speed sensor may be an encoder sensor. The speed sensor is configured to output a signal to the controller indicating the speed of the rotor 19. Since the impeller and rotor are fixed, the impeller speed can be inferred based on the rotor speed. The measured M/G speed 73 is shown as trace 73 in FIG. 3A.

At operation 112, the controller determines the relative weighting between the feedback torque relative to the feedforward torque. This could be achieved by adjusting the gains of the PID controller or by applying a scaling factor to the feedback torque. During the first rate when the feedforward torque is the highest, the feedback gains could be selected to be small values. As the impeller speed increases, for example, during the third rate and beyond, nominal values of the feedback gains could be selected (e.g., larger values than during rate 1).

At operation 114 the feedback torque is calculated based on a speed error 82. The error 82 may be the difference between a commanded M/G speed 66 and the measured M/G speed 73. The controller dynamically inserts the speed error 82 into the feedback component of Eq. 1, and adjusts the torque command up or down accordingly to reduce the speed error at operation 116. The feedback torque is shown as trace 86 in FIG. 3C. At operation 118 the controller provides the adjusted torque command 84 to the M/G 18.

Figure 5:
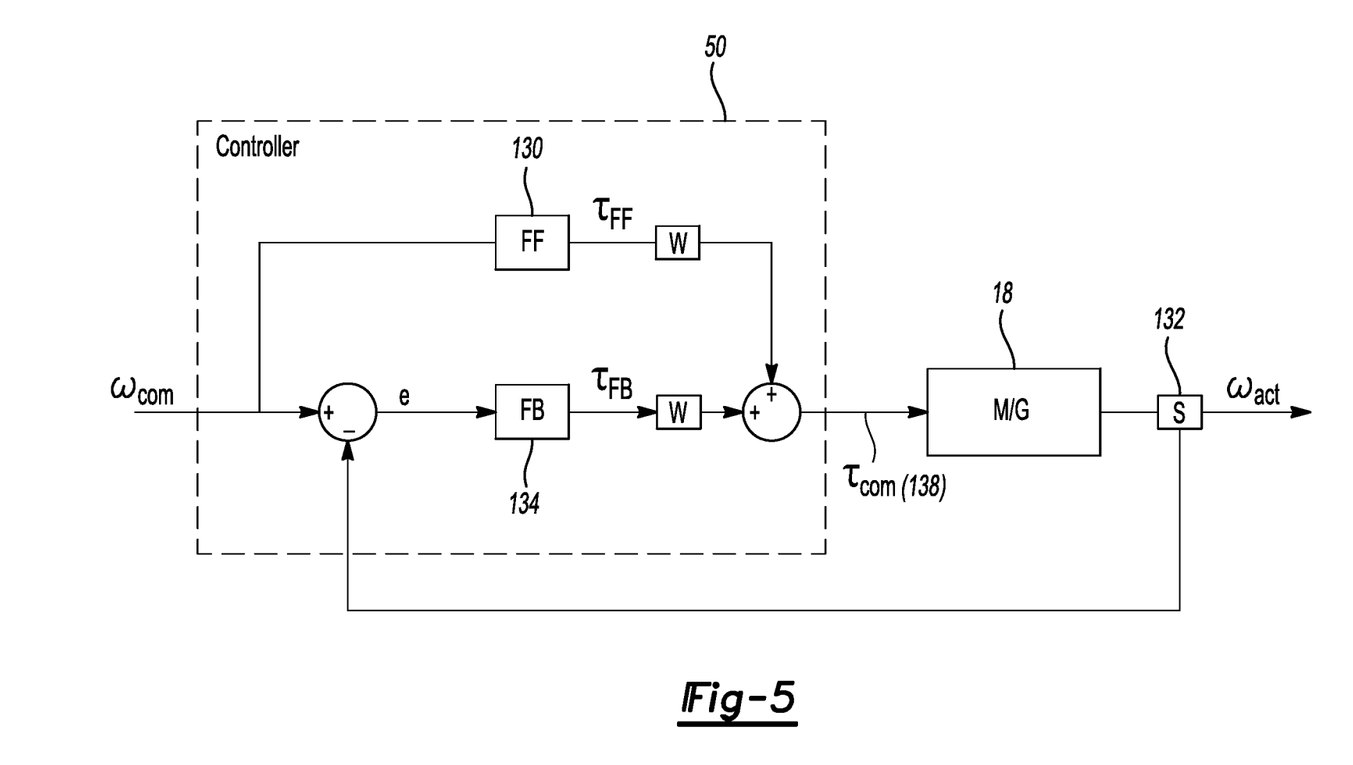
FIG. 5 illustrates control for controlling motor/generator speed during impeller spin-up using feedforward and feedback controls.

FIG. 5 illustrates a control structure that outputs a torque command to the M/G 18 according to an algorithm including feedforward and feedback components. In response to creep control being requested and the impeller being below the turbine-stall speed, the controller enters an impeller-spin-up-control mode where torque is supplied to the M/G 18 according to Equation 1, for example. In this mode, a commanded M/G (or impeller) speed is generated based on mapping saved in the memory of the vehicle. Based on the commanded M/G speed, a feedforward-torque command 130, which is proportional to the rate of change of the speed request, is generated using Equation 1. The feedforward torque may be weighted according to the inertia of the impeller, and then sent to the M/G 18. The feedforward torque is adjust by an error (e) based on a difference between the commanded M/G speed and the measured M/G speed. A speed sensor 132 of the M/G 18 may send a speed signal to the controller 50 to determine the error between the commanded and the measured speeds. The error is fed into the feedback component 134 and a feedback torque is calculated. The feedback torque may be weighted. The feedforward torque is then adjusted by the feedback torque and a torque command 138 is output to the M/G 18. This sequence may be repeated at a predetermined frequency until the controller exits impeller-spin-up control.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
 a powertrain including an electric machine driveably connected to an impeller of a torque converter; and
 a controller configured to, responsive to vehicle speed being zero and a brake pedal being released beyond a threshold position, command the electric machine to provide a torque to the impeller, the torque being a predetermined feedforward torque adjusted by a feedback torque that is based on a difference between actual and target electric machine speeds.

2. The vehicle of claim 1, wherein the electric machine further includes a speed sensor configured to measure the actual speed of the electric machine.

3. The vehicle of claim 1, wherein the command to provide the torque is further in response to an engine of the powertrain being OFF.

4. The vehicle of claim 1, wherein the command to provide the torque is further in response to a transmission of the powertrain being in DRIVE.

5. The vehicle of claim 1, wherein the feedforward torque includes a first feedforward torque commanded for a first period of time, and a second feedforward torque commanded for a second period of time subsequent to the first period of time.

6. The vehicle of claim 5, wherein the first feedforward torque is greater than the second feedforward torque.

7. The vehicle of claim 1, wherein the feedforward torque is based on an inertia of the impeller.

8. A vehicle comprising:
 an engine;
 a transmission including a torque converter having an impeller;
 an electric machine configured to provide drive torque to the impeller, and selectively coupled to the engine via a clutch; and
 at least one controller configured to, in response to the engine being OFF, the transmission being in DRIVE, a vehicle speed being zero and a brake pedal being released beyond a threshold position, command the electric machine to provide a torque to the impeller, the torque being a predetermined feedforward torque adjusted by a feedback torque that is based on a difference between measured and target speeds.

9. The vehicle of claim 8, wherein the measured and target speeds are measured and target speeds of the electric machine.

10. The vehicle of claim 8, wherein the feedback torque is limited to a predetermined maximum torque.

11. The vehicle of claim 8, wherein the controller is further configured to apply the feedforward torque for a predetermined time period.

12. The vehicle of claim 8, wherein the feedforward torque includes a first feedforward torque commanded for a first period of time, and a second feedforward torque commanded for a second period of time that is subsequent to the first period of time.

13. The vehicle of claim 12, wherein the first feedforward torque is greater than the second feedforward torque.

14. The vehicle of claim 9, wherein the feedforward torque is based on an inertia of the impeller.

15. The vehicle of claim 8, wherein a rotor of the electric machine and the impeller are fixed to each other.

16. A method of restarting a torque-converter impeller driveably connected to an electric machine, the method comprising:
 in response to a vehicle speed being zero and a brake pedal being released beyond a threshold position, commanding the electric machine to provide a torque to the impeller, the torque being a predetermined feedforward torque proportionally adjusted according to a difference between measured and target electric machine speeds.

17. The method of claim 16, wherein the proportional adjustment of the feedforward torque is limited to a predetermined maximum torque.

18. The method of claim 16 further comprising issuing a creep command in response to an electric machine speed being zero and a brake pedal being released beyond a threshold position.

19. The vehicle of claim 9, wherein the electric machine includes a speed sensor, and the measured speed of the electric machine is measured by the speed sensor.

* * * * *